United States Patent [19]

Thompson

[11] 4,272,312

[45] Jun. 9, 1981

[54] PROCESS FOR EXTRUDING FILMS OF THERMOPLASTIC POLYESTER FILM-FORMING MATERIALS

[75] Inventor: Kenneth P. Thompson, Canton, N.C.

[73] Assignee: Champion International Corporation, Stamford, Conn.

[21] Appl. No.: 90,403

[22] Filed: Nov. 1, 1979

[51] Int. Cl.³ .............................................. B29D 7/02
[52] U.S. Cl. ........................... 156/244.11; 156/244.18; 156/244.19; 156/267; 264/145; 264/176 R; 425/131.1; 425/133.5; 425/462
[58] Field of Search ...................... 156/244.11, 244.18, 156/244.19, 244.25, 267; 264/138, 145, 146, 148, 161, 171, 176 R; 425/131.1, 133.5, 114, 462, 463, 465, 466

[56] References Cited

U.S. PATENT DOCUMENTS

| | | | |
|---|---|---|---|
| 3,535,409 | 10/1970 | Rohde | 425/133.5 |
| 3,557,262 | 1/1971 | Mitchell et al. | 264/171 |
| 3,629,037 | 12/1971 | Masuda et al. | 156/244.11 |
| 3,652,371 | 3/1972 | Hirata | 156/244.11 |
| 3,737,354 | 6/1973 | Hattari | 156/267 |
| 3,909,170 | 9/1975 | Riboulet et al. | 425/133.5 |
| 4,093,486 | 6/1978 | Honkaven et al. | 156/244.19 |

Primary Examiner—Caleb Weston
Attorney, Agent, or Firm—Evelyn M. Sommer

[57] ABSTRACT

Disclosed is an improved process for extruding films of thermoplastic polyester film-forming materials. The process enables extrusion of films with reduced problems of neck-in, edge-weave and beading, by feeding a small amount of a polymer which is readily processable with the polyester into the extruder die in the area near the edges of the elongated die opening. The different polymers commingle at the edge portions and thereby provide a controllable edge. In the preferred embodiment, a small amount of a low-to-high density polyethylene is injected into the film-forming die near the edge portion of a stream of polyethylene terephthalate prior to extrusion. The resulting milky-appearing edges are preferably cut from the film, and the film is then adhered to a paperboard substrate.

13 Claims, 3 Drawing Figures

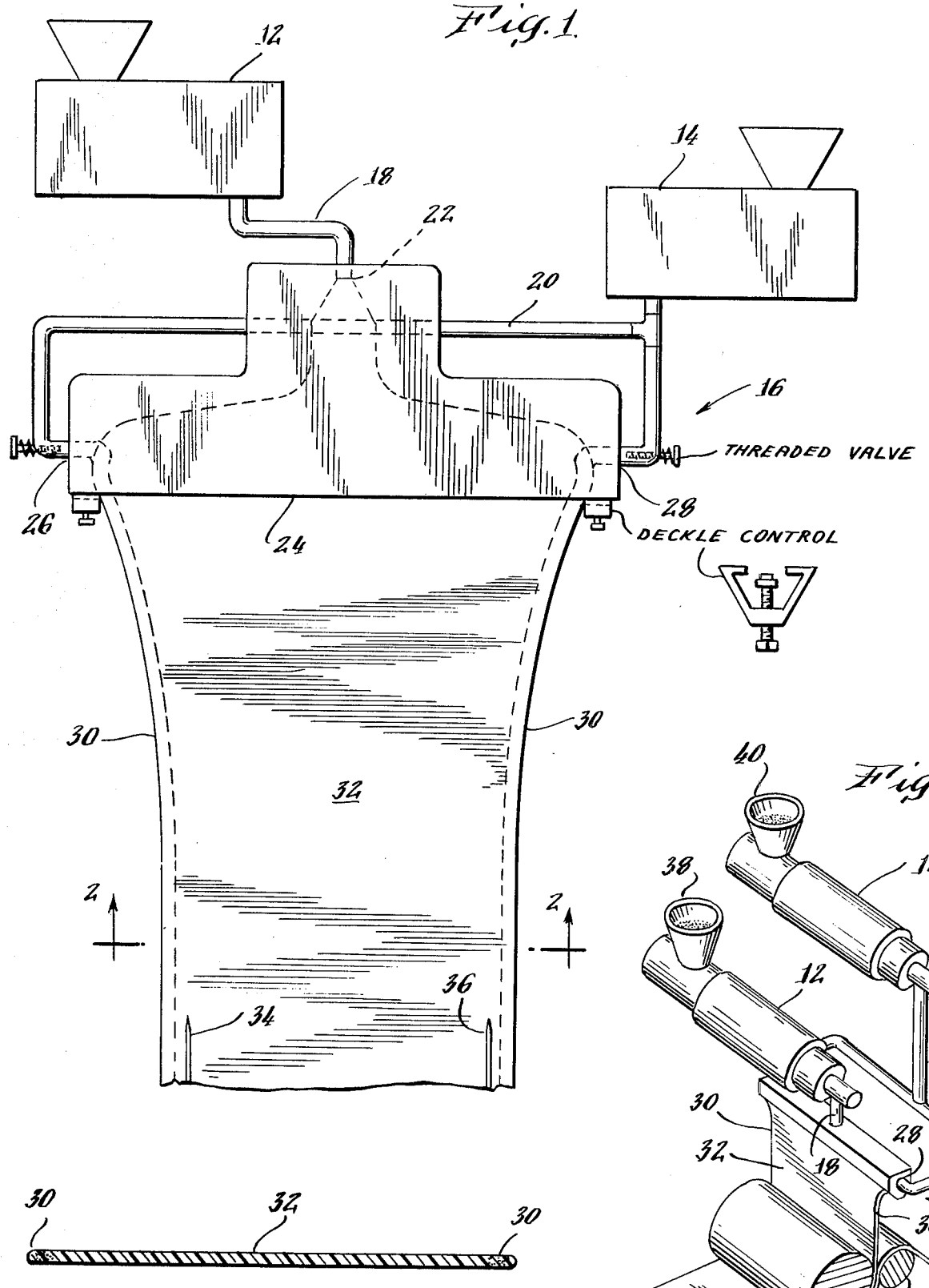

PROCESS FOR EXTRUDING FILMS OF THERMOPLASTIC POLYESTER FILM-FORMING MATERIALS

BACKGROUND OF THE INVENTION

This invention relates to the production of extruded thermoplastic films, and more particularly to an improved process for preparing films from polyesters and laminates employing these films.

The number of uses for extruded plastic films in general and polyesters in particular, has increased steadily in recent years. Their uses in food packaging alone have accounted for much of the increased volume of polymer films used commercially. Films made of polyester materials are particularly useful in food packaging due to their good moisture barrier properties and their freedom from any harmful residues which may pass into the food materials. Polyesters films have been particularly useful in packaging frozen foods, and laminates of polyesters on paperboard substances are very suitable for forming rigid packaging structures which may be employed for transporting and storage of the foods as well as for use as cooking containers in microwave ovens.

There are essentially two methods for preparing films made of polyester resins. In one, a stream of molten polyester film-forming material is passed through an elongated sheeting die which has an elongated slit die opening. Upon exiting the die, the material is drawn from the die opening at a rate greater than the rate of extrusion. The film, drawn in this manner, it thinned out to a thickness suitable for the intended utility and can be cooled and rolled or coated onto a substance prior to cooling.

In the other process for preparing polyester films, a circular die having an annular die opening is employed. The molten polymer is passed from the annular opening to form a tubular extrudate in which a gas is held under pressure to stretch the film in the direction transverse to the machine direction. Stretching in the machine direction can also be obtained by virtue of nip rollers which collapse the film and draw it from the die opening at a rate greater than the rate of extrusion.

Both of these extrusion procedures have their known advantages as well as limitations. When a particular set of conditions dictates the use extrusion in the form of a flat film from an elongated sheeting die, there has always been the problem with polymers in general, and polyesters in particular, that the film tends to neck-in and fluctuate to an undesirable degree as it is drawn from the die opening. This neck-in causes a bead to form at the edges of the film and also causes the edge of the material to weave or otherwise become uneven. This problem is especially pronounced with the extrusion of polyester films. Because there are very few applications where a necked-in film can be used as is without trimming off the undesirable portions along the edges, there is a great deal of wastage involved not only in the polymer employed but, also any substrate to which it is applied to those cases where it is not practical to trim the film prior to laminating it to the substrate.

A number of procedures have been proposed to obviate the problem of heavy or uneven edges on extruded plastic materials in the form of films. One such proposal involves metering the extrudate with deckle rods, adapted to control the beading, disposed in the extrusion die. This is discussed, for example, in U.S. Pat. No. 2,982,995.

In another proposal for solving this problem, U.S. Pat. No. 3,356,556 suggests splitting the film longitudinally by means of at least one wire disposed in the path of the film prior to laminating the film to a suitable substrate. By maintaining the width of the film strip to less than about 1.5 inches, the problem of beading at the edge was not noticeable. However, this particular practice is not suitable for the formation of wider films, such as those required for use in food trays suitable for microwave heating or the like.

In another proposal for controlling the neck-in problem attempts have been made to provide means for holding either the inherently-formed or an intentionally-enlarged bead area to restrain the normal tendency of the film to decrease in width. Such means are in the nature of air jets which cool the film below the adhesion point. However, this procedure has not been as successful as would be desired in view of the high capital and operating expenses required. Thus, there remains a need to provide an improved process for extruding polyester films to avoid these problems.

SUMMARY OF THE INVENTION

Accordingly, it is an object of the present invention to provide an improved process for producing polyester films from an elongated film-forming die which controls the neck-in, heavy uneven edge formation, and beading problems normally associated with extruding polyesters from these types of dies.

It is a more specific object of the present invention to provide an improved process for producing polyester films which better control the neck-in, heavy uneven edge formation, and beading problems normally associated with elongated film-forming dies, which process thereby increases the usable film area for a given weight of polymer.

These and other objects are accomplished according to the present invention which provides a process for forming a film of a thermoplastic film-forming polyester comprising the steps of: (a) heating and plasticizing the polyester; (b) feeding the heated and plasticized polyester to a die having an elongated die opening therein; (c) heating and plasticizing a second organic polymer which is normally not readily processible with the polyester; (d) feeding the heated and plasticized second organic polymer into the die and directing it toward the opposite ends of the elongated die opening sufficiently upstream of the opening to permit intimate mixing of the polyester and the second polymer in the areas in both opposite ends of the elongated die, thereby forming a composite stream of the polyester and second polymer; (e) expressing the composite stream from the elongated die opening to form a film comprising a central portion of the polyester and two edge portions comprising a mixture of the polyester and the second polymer, the central portion of the polyester covering at least a major part of the width of the film; and (f) drawing the film from the die opening at a rate greater than the rate of extrusion to thereby reduce the thickness of the film. The invention also provides a process for preparing a laminate comprising at least one layer of a polyester film made in the manner described above.

BRIEF DESCRIPTION OF THE DRAWINGS

The invention will become better understood and its advantages will become more apparent from the following detailed description, especially when read in light of the attached drawings, wherein:

FIG. 1 is a schematic representation of one embodiment of the invention showing the injection of a second polymer into the die at the edge portions of a film being extruded;

FIG. 2 is a cross section of the extruded film taken along line 2—2 in FIG. 1; and FIG. 3 is a schematic view of another embodiment of the present invention wherein a laminate is formed by contacting an extruded film with a substrate.

DETAILED DESCRIPTION

The present invention provides an improved process for preparing polyester films with reduced neck-in, uneven and beaded edge formation and other problem associated with these known defects. The type of polyester resin employed is not critical in and of itself to the present invention, but can be any thermoplastic, film-forming polyester polymer olefin polymer or copolymer which is known to be subject to the noted deficiencies. The process of this invention involves the injection of a small amount of a second polymer which is not normally readily processible with aforementioned polyester or olefin polymer or copolymer into the edge portions of the die which forms the polyester material into a film. The second polymer may be any of those thermoplastic, organic, film-forming polymers which are not normally processible with the polyester but which will in accordance with the invention, be processible and improve the quality of the edge formation of the film.

There are a wide variety of suitable polyester resins having desirable film-forming properties and good physical properties in the finally formed film. While any of these can be employed, it is preferred to use those having an intrinsic viscosity within the range of from about 0.50 to 1.05, and most suitably, of about 0.70. Among the preferred polyester resins would be any one of those members selected from the group consisting of polyethylene terephthalate, polymethyl methacrylate, polybutylene terephthalate, and blends and copolymers of these. It is noted that while the invention in the main contemplates the preparation of polyester films, this invention can be equally satisfactorily used in the preparation of polypropylene films.

The preferred polyester is polyethylene terephthalate which is a polyester formed by the condensation reaction of ethylene glycol and terephthalic acid. These polyesters are well known and are more particularly described in U.S. Pat. No. 2,465,319 and U.S. Pat. No. 3,939,025. As used herein, the term "polyethylene terephthalate" is meant to include the polymers containing at least about 97% of repeating ethylene terephthalate units and copolymers of ethylene terephthalate as set forth in U.S. Pat. No. 3,939,025. Both of these referred to patents are incorporated herein by references in their entirety, and especially for the pertinent discussion of the polyester resins, their preparation, and the manner in which they are formed into films.

Among the suitable polymer materials for the use as the second polymer according to this invention are the polyolefins, particularly any one of the members selected from the group consisting of high density polyethylene, low density polyethylene, medium density polyethylene, high density polyethylene and polypropylene. The preferred polyolefins according to the present invention are the low-to-high density polyethylenes. These are typically formed by moderate-to-high temperature and pressure catalytic processes and contain moderate-to-large percentages of side chained molecules. Because these molecules do not lend themselves to growth of crystals as the polymers cool and solidify, they typically have 75% or less crystallinity and densities of below about 0.940. Polyethylenes with densities of below about 0.925 are particularly preferred. These densities are expressed in terms of grams per cubic centimeter in accordance with ASTM test D792-50 method B, or ASTM test D1505-57T, as the case may be. The suitable polymer materials preferably have a high melt index. Of course the second polymer material must have a lower neck-in characteristic than the first polymer material being extruded.

With this brief understanding of the nature of the materials which can be employed according to the present invention, attention is now directed to the drawings wherein FIG. 1 shows a schematic representation of one embodiment according to the present invention wherein a polyethylene terephthalate film-forming thermoplastic polymer is extruded into a film, and wherein a low density polyethylene is injected into the extrusion die prior to extrusion at the edge portion of the polyester film.

Two extruders 12 and 14 are shown which plasticize the polyester and the polymer to be processed therewith and then feed these polymers to a film-forming die 16 via lines 18 and 20, respectively. The polyester material is fed into the die 16 at inlet 22 and is then spread out and flattened as it approaches elongated die opening 24 from which it is extruded as a film. The second polymer is fed into the die 16 at inlets 26 and 28 near the edge of the stream of melted and plasticized polyester as it is being flattened to form a film. The second polymer is fed to the edge portions of the polyester stream sufficiently upstream of the die opening 24 to permit commingling and intimate mixing of the two polymers. In the exemplary case of polyethylene terephthalate as the polyester resin and a high density polyethylene as the second polymer, a milky-white mixture is formed of the two materials limited to just the overlap area. This is shown generally in the drawing as edge 30. This can also be seen in the cross-sectional view of FIG. 2.

Upon exiting the die opening 24 the film 32 is drawn and thereby thinned by nip rollers, not shown. These rollers draw the film from the die opening 24 at a rate greater than the rate of extrusion to thereby thin it out and improve its mechanical properties. The drawing or stretching operation causes, however, the undesirable neck-in or decrease in width shown in FIG. 1 whereby the effective width of the film is decreased. In the normal circumstance where the present invention is not employed to inject the second polymer at the edges of the film, the necking is more pronounced than in the present case and, the area near the edge portion shown as 30, will typically be in the shape of a bead which can have a thickness of ten times or more of the central portion of the film 32. The edge portion 30 of the film 32 would also typically be uneven and somewhat wavy. This problem is also reduced. The net effect of the present invention, then, is to make the process of extruding a polyester resin more controllable, in that the edge weaving problem is minimized, and also to improve the efficiency of the operation because the neck-in and bead formation are minimized, thereby leaving more of a usable center portion of the film 32 for practical purposes.

If desired, the film 32 can be used with the edge portion 30 attached where this will not effect utility. Thus, there may be some bag forming or laminating procedures which require first quenching the film and subsequently heat sealing it where an edge portion would normally have to be removed after such further processing step. In situations like this, there would be no need to pretrim the edge portion 30. Further, there may be some utilities where the milky-white edge portion 30 could provide some decorative effect. Preferably, however, the edge portion is severed from the central portion of film 32 by suitable means such as knives, heated wires, or air under pressure, shown positioned as at locations 34 and 36 in FIG. 1. The film can be quenched either before or after severing of the edge portion 30.

The edge portion in accordance with the invention is about ⅜" in width and can also be disposed of by appropriate cutting after the roll up. This ⅜" contrasts markedly with the 3" width of edge normally required to be removed when the known extrusion methods are practiced.

It will be noted that the entrance points or inlets for the second polymer need not be positioned exactly as shown in the drawings. Thus, inlets 26 and 28 can be further upstream or downstream of the locations shown in FIG. 1 so long as adequate commingling of the second polymer with the polyester is achieved to obtain the benefits of the present invention. Thus in the exemplary situation of a polyethylene terephthalate polyester with a low density polyethylene on the edge portion, proper injection of the polyethylene will result in neck-in and edge beading more characteristic of extruding the polyethylene resin film by itself as opposed to extruding the polyester resin.

Referring now to FIG. 3 there is shown another embodiment of the present invention wherein a laminate is formed by contacting a film, extruded in the manner indicated above, with a substrate under sufficient pressure to cause adherence between the two layers. In the drawing, extruders 12 and 14 are shown with particulate polyester and second resins in hoppers 38 and 40, respectively, of the two extruders. The polymers are heated and plasticized within the extruders 12 and 14 and are then fed via lines 18 and 20 into die 16 where they are combined in the manner previously described and extruded as film 32. The film 32 is drawn from the die at a rate greater than its extrusion by rollers 42 and 44 which advance the material as well as provide a pressure contact between the film 32 and substrate 46 which is drawn over roller 44 and between the nip of rollers 42 and 44 to cause adherence of the still molten film with the substrate 46.

The substrate 46 can be of any suitable material such as a metal or plastic film or foil or, a paper sheet or board. Preferably, the substrate will be paperboard, typically of a thickness of about 0.015 inches–0.024 inches and of a density of about 10–13 lbs/cu. ft. This type of paperboard material is very suitable for use in preparing paperboard trays for storing food products in frozen condition and then heating them directly therein in a microwave oven. As in the case of forming the film described above with regard to FIG. 1, the edge portion 30 of the film 32 can be severed if desired. Severing can take place prior to passing the film between roller 42 and the substrate 46 carried on roller 44, or the entire laminate 48 can be cut along its edge portion to remove the mixture of the polyester and the second polymer at the edge portion of the laminate.

Preferably a blue die is included in the second polymer material, i.e., polyethylene so that the edge portion can be readily visualized.

The following example is presented for the purpose of further illustrating and explaining the present invention and is not to be taken as limiting in any regard. Unless otherwise indicated, all parts and percentages are by weight.

EXAMPLE

To prepare a polyester-coated paperboard laminate, a film is first prepared having a central portion of an Eastman 6857 polyethylene terephthalate polyester having an intrinsic viscosity of 0.60, and edge portions of Gulf 9216 high density polyethylene having a density of about 0.960 and an average molecular weight of about 70,000 and having a melt index of about 30. The polyester resin is heated and plasticized in a B.C. 6 inch extruder and fed into a film-forming die at a rate of 2000 lbs/hour. The die has an elongated die opening of about 90 inches in length and 0.020 inches wide. The die is arranged to extrude the polymer vertically downward at a rate of about 31.25 F.P.K. and to be drawn from the die by a pair of rollers operated at a linear speed of 500 F.P.M. The polyethylene which can be colored blue for easy demarcation is heated and plasticized in a 2 inch extruder and then fed into the die approximately 4 inches upstream of the die opening through the end plates into the metal pool of the deckled area of the die where it is merged with the stream of polyester resin at its edge portions such that it commingles and is intimately mixed with the polyester at the edge portion within the die. The two polymers thereby form a composite stream of polyester and polyethylene which is expressed from the elongated die opening to form a film comprising a central portion of the polyester and two edge portions comprising a mixture of the polyester and the polyethylene. The central portion of the polyester covers a major part of the film in this particular example being 75¾ inches wide of a total film width at the die opening of 76½ inches. As noted above, the film is drawn from the die opening at a rate greater than the rate of extrusion to thereby reduce the thickness of the film from 0.020 inches at the die opening to a final thickness of 0.00125 inches, and simultaneously to reduce the width of the film from 81 inches at the die opening to 76½ inches. Prior to quenching the film, a milk carton paperboard backing which is 0.0155 inches–0.024 inches thick and has a density of 10–13 lbs/cu. ft., is brought into contact with the polyester resin film at a distance of 4.5 inches–10 inches from the die opening. The paperboard which has been pretreated to reinforce its polymer adhesion capabilities for instance by priming, and the polyester film are pressed together with sufficient force supplied by the rollers to cause adherence of the two materials to form a laminate. The laminate is then cooled, edge trimmed, and wound for storage prior to cutting it into blanks for preparing cartons suitable for holding food in frozen storage and then heating the food in a microwave oven.

The above description is for the purpose of explaining the present invention to those skilled in the art, and is not intended to describe all those obvious modifications and variations of the invention which will become apparent upon reading the disclosure. It is intended, however, to include all those obvious modifications and variations within the scope of the invention which is defined by the following claims.

What is claimed is:

1. A process for forming a film of a thermoplastic film-forming, polyester comprising the steps of:
   (a) heating and plasticizing the polyester;
   (b) feeding the heated and plasticized polyester to a die having an elongated die opening therein;
   (c) heating and plasticizing a second organic polymer not normally readily processable with the polyester;
   (d) feeding the heated and plasticized second organic polymer into the die and directing it toward the opposite ends of the elongated die opening sufficiently upstream of the opening to permit intimate mixing of the polyester and the second polymer in the areas near both opposite ends of the elongated dies, thereby forming a composite stream of the polyester and second polymer;
   (e) expressing the composite stream from the elongated die opening to form a film comprising a central portion of the polyester and two edge portions comprising a mixture of the polyester and the second polymer, the central portion of the polyester covering at least a major part of the width of the film; and
   (f) drawing the film from the die opening at a rate greater than the rate of extrusion to thereby reduce the thickness of the film.

2. A process according to claim 1 wherein the polyester comprises a member selected from the group consisting of polymethylmethacrylate, polyethylene terephthalate, polybutylene terephthalate, and blends and copolymers of these.

3. A process according to claim 1 or 2 wherein the second polymer is a polyolefin.

4. A process according to claim 3 wherein the polyolefin is a low-to-high density polyethylene.

5. A process according to claim 1 wherein the edge portions of the film, which comprise the mixture of the polyester and the second polymer, are severed from the film.

6. A process for forming a laminate comprising the steps of:
   (a) heating and plasticizing a thermoplastic, film-forming polyester;
   (b) feeding and heated and plasticized polyester to a die having an elongated die opening therein;
   (c) heating and plasticizing a second organic polymer not normally readily processable with the polyester;
   (d) feeding the heated and plasticized second organic polymer into the die and directing it toward the opposite ends of the elongated die opening sufficiently upstream of the opening to permit intimate mixing of the polyester and the second polymer in the areas near both opposite ends of the elongated die, thereby forming a composite stream of the polyester and second polymer;
   (e) expressing the composite stream from the elongated die opening to form a film comprising a central portion of the polyester and two edge portions comprising a mixture of the polyester and the second polymer, the central portion of the polyester covering at least a major part of the width of the film;
   (f) drawing the film from the die opening at a rate greater than the rate of extrusion to therefy reduce the thickness of the film; and
   (g) bringing the film into contact with a substrate under sufficient contact pressure to cause the film to adhere to the substrate.

7. A process according to claim 6 wherein the polyester comprises a member selected from the group consisting of polymethylmethacrylate, polyethylene terephthalate, polybutylene terephthalate, and blends and copolymers of these.

8. A process according to claim 6 or 7 wherein the second polymer is a polyolefin.

9. A process according to claim 8 wherein the polyolefin is a low to high density.

10. A process according to claim 6 wherein the edge portions of the film, which comprise the mixture of the polyester and the second polymer, are severed from the film.

11. A process according to claim 6 wherein the substrate comprises paperboard.

12. A process according to claim 11 wherein the second polymer is a polyolefin.

13. A process according to claim 12 wherein the polyester comprises a member selected from the group consisting of polymethylmethacrylate, polyethylene terephthalate, polybutylene terephthalate, and blends and copolymers of these; and the polyolefin is a low-to-high density polyethylene.

* * * * *